United States Patent [19]

Inokuchi

[11] Patent Number: 4,505,570

[45] Date of Patent: Mar. 19, 1985

[54] IMAGE-FORMING OPTICAL SYSTEM

[75] Inventor: Toshiyuki Inokuchi, Yokohama, Japan

[73] Assignee: Ricoh Company, Ltd., Tokyo, Japan

[21] Appl. No.: 442,961

[22] Filed: Nov. 19, 1982

[30] Foreign Application Priority Data

Nov. 18, 1981 [JP] Japan .................................. 56-184845

[51] Int. Cl.³ .............................................. G03G 15/04
[52] U.S. Cl. .................................... 355/3 R; 355/51; 350/286; 350/445
[58] Field of Search ................ 355/1, 11, 49, 65, 66, 355/51, 3 R; 350/286, 445, 569

[56] References Cited

U.S. PATENT DOCUMENTS

| 3,836,249 | 9/1974 | Weber ................................... 355/51 |
| 4,168,900 | 9/1979 | Adachi .................................. 355/1 |
| 4,289,377 | 9/1981 | Matsui et al. ...................... 355/51 X |
| 4,316,665 | 2/1982 | Mochizuki et al. ............... 355/51 X |

Primary Examiner—A. T. Grimley
Assistant Examiner—J. Pendegrass
Attorney, Agent, or Firm—Oblon, Fisher, Spivak, McClelland & Maier

[57] ABSTRACT

A small-size image formation optical system including two types of a plurality of Porro prism lenses, with an upper lens surface and a lower lens surface of each Porro prism lens being in the form of mirror images, said Porro prism lenses being combined to form arrays which are shifted by a half period in phase, capable of forming an erect real image.

8 Claims, 17 Drawing Figures

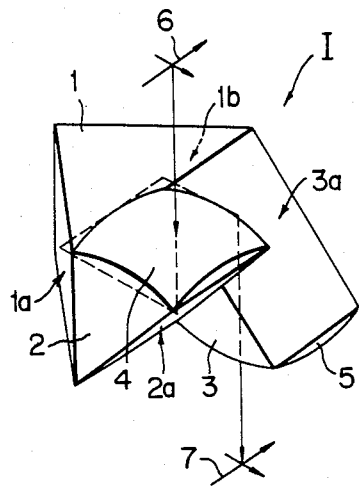
FIG. 1
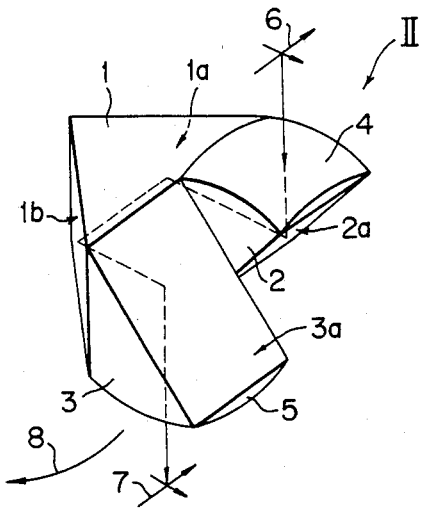
FIG. 2
FIG. 3
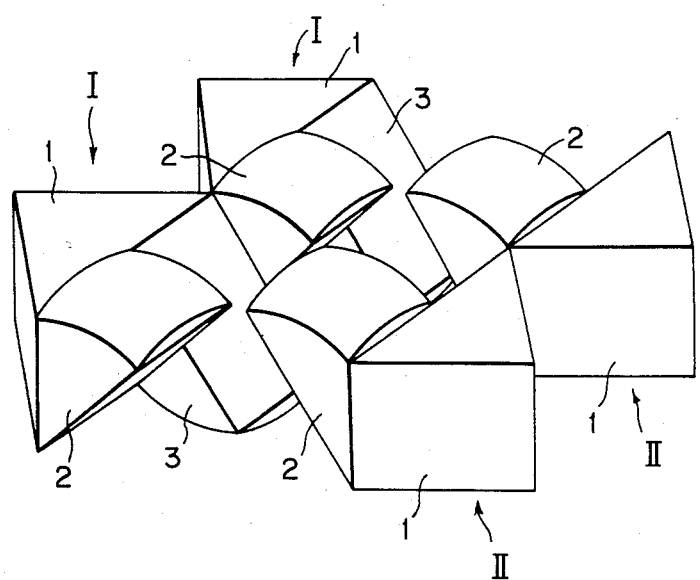

F I G. 4
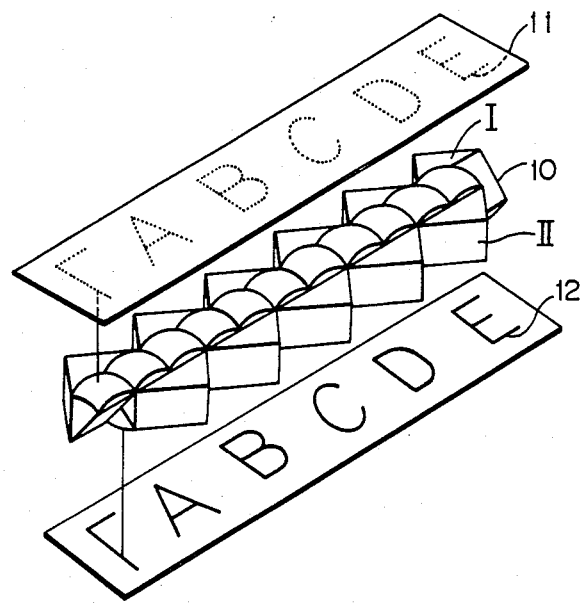
F I G. 5
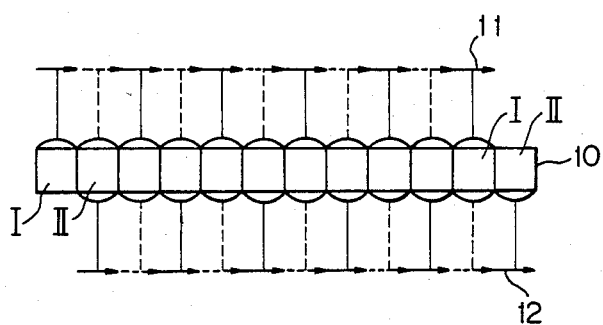
F I G. 6
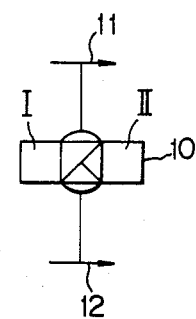

IMAGE-FORMING OPTICAL SYSTEM

BACKGROUND OF THE INVENTION

1. Field of the Invention

The present invention relates to a small-size image-formation optical system for use with image information processing apparatus, and more particularly to a small-size image-formation optical system utilizing Porro prism lenses for use with image information processing apparatus.

2. Description of the Prior Art

Conventionally, a small-size image formation optical system is disclosed in Japanese Patent Publication No. Sho 49-008,893, in which a strip lens array is employed. This strip lens array comprises a plurality of small-size lenses in the form of long, narrow plates arranged in an array, and the optical axes of the individual lenses are arranged in concurrence, with fixed spacing in a three-layer configuration. However, in this layered lens array construction, since an inverted image is formed in the intermediate lens array and is then converted to an erect image through a relay lens, the image performance is limited as to the degree of resolution and brightness. In addition, a shield plate is required to prevent flare between adjacent lenses, as is a diaphragm plate to compensate for irregularities in the quantity of light. Furthermore, even though a diaphragm plate is used, it is not possible to compensate for the irregularities in the quanitity of light in the direction of the array. Therefore, the use of the diaphragm plate for line-scanning in the direction of the array is not appropriate. In addition, because a suitable distance is usually necessary between the first and third lenses in a layered lens array, the distance between the object and the image becomes elongated, and the amount of possible miniaturization is limited.

SUMMARY OF THE INVENTION

The small-size image-formation optical system according to the present invention comprises two types of a plurality of Porro prism lenses, of which the upper curved surface and the lower curved surface are arranged inversely, left to right, in mirror-image fashion, so as to face each other in such a configuration as an array extending in the same direction, whereby the light distribution phases of these lenses are relatively shifted in phase by a half period. A Porro prism has the function of reversing an input image pattern left to right and top to bottom, and outputting the reversed image pattern. Since a Porro prism lens has the function of forming an inverted real image, it is possible to form an erect real image by combining Porro prism lenses appropriately. The optical system according to the invention is characterized in that two types of Porro prism lenses, which are constructed so as to be the reverse of each other left to right, in mirror-image fashion, are arranged in close contact, and are arranged in the direction to their left-to-right alignment. Furthermore, the optical system according to the invention has the advantage of being compact, bright and of high resolution, does not need a shield plate to prevent flare, nor is a diaphragm necessary to compensate for irregularities in the quantity of light. It also has the advantage that it can be used for line scanning. In addition, the small size image-formation optical system according to the invention is appropriate for application in recording apparatuses, reading apparatuses, and data processing apparatuses such as slit-exposure type copying machines. By applying the optical system according to the invention to these types of apparatuses it will be possible to make them more compact, at lower cost and with high performance.

It is therefore an object of the present invention to provide an improved small-size image-formation optical system.

Another object of the invention is to provide an optical system of the above-mentioned type which is capable of forming an erect real image, is compact, bright and has high resolution.

Still another object of the invention is to provide the above-mentioned optical system which is capable of preventing flare and can compensate for irregularities in the quantity of light without use of a shield plate or a diaphragm plate, and therefore is appropriate for line scanning.

A still further object of the invention is to provide the above-mentioned optical system which is appropriate for application in recording apparatuses, reading apparatuses, and slit-exposure type copying machines.

These objects of the invention and other objects will be apparent from the following explanation with reference to embodiments of the invention in conjunction with accompanying drawings.

BRIEF DESCRIPTION OF THE DRAWING

FIG. 1 is a perspective view of the basic configuration of a Porro prism lens Type I for the small-size image-formation optical system in accordance with the invention.

FIG. 2 is a perspective view of the basic configuration of a Porro prism lens Type II for the small-size image-formation optical system in accordance with the invention.

FIG. 3 is a perspective view of a plurality of Porro prism lenses of Type I and Type II disposed to face each other.

FIG. 4 is a perspective view of the smaller-size image-formation optical system of the invention, together with an object pattern and an image pattern.

FIG. 5 is a front elevational view showing the image forming conditions of the image-formation optical system shown in FIG. 4.

FIG. 6 is a side elevational view showing the image forming conditions of the image-formation optical system shown in FIG. 4.

DETAILED DESCRIPTION OF THE PREFERRED EMBODIMENTS

Figure 7:
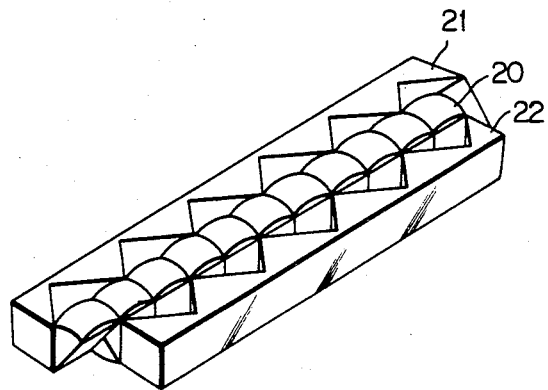
FIG. 7 is another embodiment of a small-size image-formation optical system of the invention.

FIGS. 1 and 2 show the two different types of Porro prism lenses used in the invention and their image forming conditions. The Porro prism lens shown in FIG. 1 is called Type I, while the Porro prism lens shown in FIG. 2 is called Type II. Type I and Type II are made up so as to be mutually reversed, left to right, in the configuration shown. Each Porro prism lens is made of a first rectangular prism 1, a Porro prism consisting of second and third rectangular prisms 2 and 3 formed on the base of the first rectangular prism 1 (hereafter the surface opposite to the right angle is referred to as the base, while the two-sided surface is referred to as the oblique plane) in such a configuration that the base of one of the second and third rectangular prisms 2 and 3 is directed downwards, while the base of the remaining prism is directed upwards with respect to the base of the first rectangular prism 1; a lens 4 formed on the upper surface of the second rectangular prism 2; and a lens 5 formed on the lower surface of the third rectangular prism 3. In the Porro prism lens Type I, the light from an object 6, after entering the lens 4, reflects from the base 2a of the prism 2, from the oblique planes 1a and 1b of the prism 1, and from the base 3a of the prism 3, emerging from the lens 5 to form an erect real image 7. The Porro prism lens type II also forms an image in the same way. A Porro prism has the function of outputting an image pattern completely reversed, left to right, top to bottom, from the input image pattern, and the lens has the function of forming an inverted real image. Therefore, if the lenses are disposed at the incident surface and emergent surface of the Porro prism, an erect real image can be formed.

The optical system in accordance with the invention is made up of these two types of Porro prism lenses, counter-positioned left and right, for example, by turning the prism lens Type II shown in FIG. 2 by 180 degrees in the direction of the arrow 8 and placing the prism lens Type II in close counter-position with the prism lens Type I, and, at the same time, by arranging a plurality of groups of the lenses alternately arranged in sequence. In FIG. 3, these two types of prism lenses are shown, alternately arranged to form an array. In this Porro prism lens, the two rectangular prisms 2 and 3 are the same in size, and are one half of the size of the base of the rectangular prism; therefore, in the Porro prism lens array, the different types of prism lenses are mutually assembled in such a configuration that the light distribution phases of these lenses are shifted by one half period relatively, so that the array is constructed with a maximum Porro prism density. The length of the array can, in theory, be unlimited, but in practice the size of the array depends upon the apparatus in which the array will be used.

Referring to FIG. 4, there is schematically illustrated an image formation optical system in accordance with the invention, which has the type of configuration just described, together with an object pattern 11 and an image pattern 12, and its front elevation is shown in FIG. 5, and side elevation in FIG. 6. In FIG. 5, the solid lines indicate the image formation by the Type I lens array, while the broken lines represent the image formation by the lens array Type II. FIG. 5 shows clearly the formation of an erect real image, with the arrangement of the lenses in the direction of the row.

Figure 8:
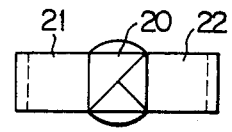
FIG. 8 is a side elevational view of the image-formation optical system shown in FIG. 7.
Figure 9:
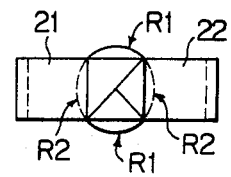
FIG. 9 is a side elevational view of a modified embodiment of the image-formation optical system shown in FIG. 7.
Figure 10:
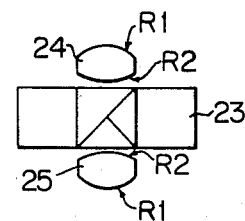
FIG. 10 is a further embodiment of a small-size image-formation optical system of the invention.

In the above explanation of the configuration, the optical system according to the invention is stated to be a combination of two different types of Porro prisms. The lens array Type I and the lens array Type II each can be made of plastic resin or similar material to form a single unified body, and the two assembled as one body are able to provide the required configuration. By forming one unit from this type of plastic, it is expected that considerable improvement in accuracy of surface alignment, large scale productivity, and cost reduction will be possible. In addition, with the entire optical system configuration, as shown in FIG. 7, each outside rectangular prism in the Porro prism lens array is detected from the central lens array 20 to convert the rectangular lenses to mirror arrays 21 and 22. FIG. 8 illustrates a side elevational view of an optical system of such a type or configuration. In this case, as shown in FIG. 9, it is possible to provide a different curved surface for both side surfaces of the central lens 20, with a curvature $R_2$ different from the curvature $R_1$ for the top curved section and for the bottom curved section. Furthermore, as another configuration for an optical system in accordance with the invention, as shown in FIG. 10 it is possible to combine independent lenses 24 and 25 with the Porro prism 23, as its upper curved surface and lower curved surface formed completely separately from the Porro prism 23. These lenses 24 and 25 are made in the form of an array corresponding to each Porro prism. It is preferable that the outer curved surfaces of the lenses 24 and 25 have the curvature $R_1$, while the inner curved surfaces thereof have a different curvature $R_2$.

Figure 11:
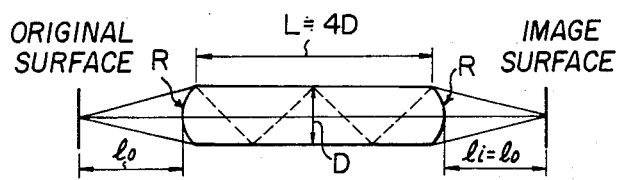
FIG. 11 is a layout diagram of a lens equivalent to the optical system shown in FIG. 6.
Figure 12:
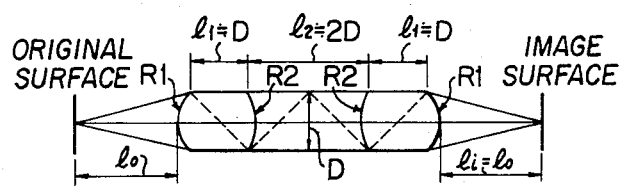
FIG. 12 is a layout diagram of a lens equivalent to the optical system shown in FIG. 9.
Figure 13:
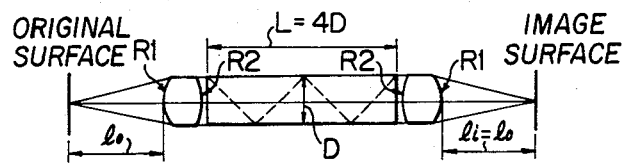
FIG. 13 is a layout diagram of a lens equivalent to the optical system shown in FIG. 10.

The equivalent layouts for each of these different configurations are shown in FIGS. 11, 12 and 13. FIG. 11 corresponds to the configuration in FIG. 6; FIG. 12 corresponds to the configuration in FIG. 9; while FIG. 12 with $R_2=\infty$ (infinity) corresponds to the configuration in FIG. 8; and FIG. 13 corresponds to the configuration in FIG. 10. The setting conditions for lens diameters, D, and the lens surface spacing (or prism aperture surface spacing) L in the above configurations are also shown in those drawing figures.

Other factors, such as the curvatures $R_1$, $R_2$, and the refractive indexes n of other lenses, are set in accordance with the proper conditions for making the synthetic distribution of the quantity of light of the multilens array uniform, so as to be in agreement with any restrictive operating conditions, such as the object distance (focal length f) and brightness of each lens. With reference to the equalization of this synthetic distribution of the quantity of light, that is to say, the elimination of the periodically produced irregularties in the amount of light, the present applicant has described the particulars in detail in Japanese patent application 55-112,490. To quote one portion thereof here, for instance, in the case where the optical system in accordance with the invention is applied for line scanning, the pitch p of the arrangement of the lenses to equal the distribution of the light can be determined by use of the following approximate equation.

$$p \approx \left(\frac{y_1^2}{4} - x_1^2\right)^{\frac{1}{2}} + \left(\frac{y_2^2}{4} - x_1^2\right)^{\frac{1}{2}}$$

Figure 14:
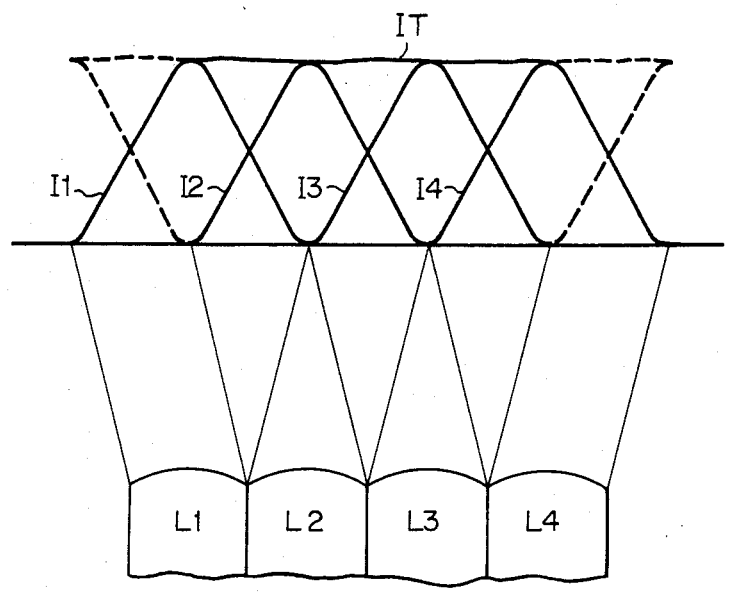
FIG. 14 is an illustration showing the distribution of quantity of light and the synthesized quantity of light for each Porro prism lens of the small-size image-formation optical system of the invention.

$y_1$: image diameter with aperture efficiency 100%
$y_2$: effective image diameter (size)
$x_1$: distance between the scanning set position and the optical axis In FIG. 14, the distribution of the quantity of light and its synthetic quantity of light of a single lens system for the optical system in accordance with the invention are shown. The distribution quantity of light of each lens system is almost triangular in shape as shown in FIG. 14. This is preferable for uniform syntheses of the quantity of light. In the above equation, when $x_1=0$ and $y_1=0$, $P \approx y_2/2$ indicates the most appropriate conditions for uniform syntheses of the quantity of light. In fact, the light distribution $I_1$ through $I_4$ of the Porro prism lenses $L_1$ through $L_4$ can be uniformly synthesized as shown by $I_1$.

Examples of settings of the above factors for lens with the above-described conditions are as follows: Example 1 corresponds to a configuration equivalent to that shown in FIG. 11, while Example 2 corresponds to a configuration equivalent to that shown in FIG. 12. Because the configuration shown in FIG. 13 closely resembles the configuration shown in FIG. 12, an example thereof is omitted.

EXAMPLE 1

Material: Polymethyl methacrylate (nd=1.491)

$R = 4.6$     $l_o = 9.3$
$D = 3.0$     $L = 12.0$
$P \approx D = 3.0$     Object distance = 2.16
Performance: $f = 8.16$ mm   F/1.56
MTF 60% or more with entire image area (at 4lP/mm)

EXAMPLE 2

Material: Polymethyl methacrylate (nd=1.491)

$R_1 = 9.8$    $R_2 = 34.0$    $l_o = 15.5$
$D = 5.0$    $P \approx D = 5.0$
$l_1 = 5.8$    $l_2 = 5.0$
Object distance = 36.0
Performance: $f = 16.3$ mm   F/1.6
MTF 64% or more within entire image area (at 4lp/mm)

The small size, image formation optical system in accordance with the invention is considerably more compact and considerably more efficient in performance as compared with the conventional optical system with a strip-lens-array configuration. In addition, compared to other optical systems using rectangular prisms or roof mirrors, the performance is superior in the optical system in accordance with the invention, because the center section of each prism surface is utilized as an effective reflecting surface, and because the light is transmitted without being adversely effected by the inferior portions thereof where it is difficult to attain a high degree of levelness near the edge of the rectangular prism. Furthermore, in this optical system in accordance with the invention, it is not necessary to dispose a shield for flare prevention between adjacent lenses due to the structure of the optical system, and, in addition, because the light distribution can be easily made uniform, it is possible to apply this system to line-scanning optical equipment without use of any special diaphragm to correct for irregularities in the quantity of light. Furthermore, by making the effective image size $y_2$ slightly larger than the array pitch p, that is to say, $p \lesssim y_2/2$, the irregularlities in exposure at a particular slit width which is symmetrical with respect to the optical axis, can be eliminated without using a correction plate, and because of this, the small-size image formation optical system in accordance with the invention can be appropriately used in surface-scanning optical equipment. In other words, the periodic light irregularities in the lens array are shifted in phase by $\pi$ from a certain position in the direction of the height of the exposure. By utilizing such a shift, the irregularities of the exposure are eliminated so as to cancel the nonuniformity of the quantity of light at a specific width of the exposure slit.

Figure 15:
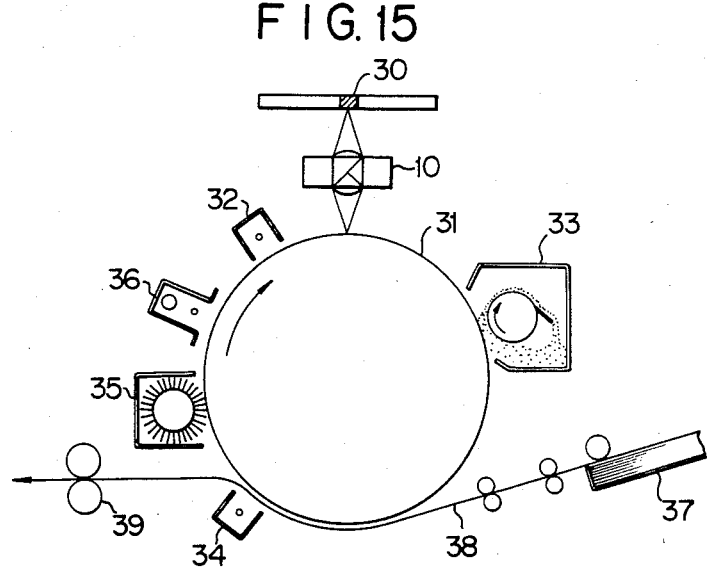
FIG. 15 is a schematic illustration of one example of a recording apparatus using the small-size image-formation optical system of the invention.

The small size image formation optical system of the invention is appropriate for practical application to image information processing apparatus. By the application of the optical system of the invention, a compact, low cost, low power consuming, high speed and high-image-quality yielding apparatus can be realized. Referring to FIG. 15, there is shown an example of a recording apparatus in which an embodiment 10 of a small-size image formation optical system of the invention is employed. The optical system 10 is disposed between a solid light emission element array 30, which parallels the optical system 10, and a photoconductor drum 31. As the light emission element array 30, a solid light emission element array such as an LED array or an LD array, or a light shutters switching array utilizing an electrical optical effect, such as PLZT, can be used. The photoconductor drum 31 is a unit comprising a photoconductive insulating layer formed on the surface of an electrically conductive drum, and around its circumference are arranged an electrical charger 32, a development apparatus 33, an image transfer charger 34, a cleaning apparatus 35, and a quenching charger 36 equipped with a quenching lamp. The surface of the photoconductor drum 31 is first electrically charged uniformly to a predetermined polarity by the electrical charger 32. From the light emitting element array 30, a light emission pattern, passing through the image formation optical system 10, is projected onto the surface of the photoconductor drum 31, so that the electric charges on the photoconductor drum 31 are selectively dissipated, and electrostatic latent images are formed, corresponding to the light emission pattern. The electrostatic latent images are developed to visible images by colored fine particles, called toner, which are electrically charged to a polarity opposite to that of the latent images, which colored fine particles are supplied from the development apparatus 33. Next, a transfer sheet 38 from the transfer sheet cassette 37 is superimposed on the developed images, and the images are transferred to the transfer sheet 38 by electric charges of a polarity which attract the toner from the image transfer sheet 34 being applied from the back of the image transfer sheet. After image transfer, the transfer sheet 38 is separated from the surface of the photoconductor drum 31, and the transferred toner images are fixed permanently on the surface of the transfer sheet 38 by an image fixing apparatus 39. In the meantime, after image transfer the residual toner on the surface of the photoconductor drum 31 is removed therefrom by the cleaning apparatus 35, and after that, the residual charges are removed by the quenching charger 36 equipped with a quenching lamp.

Figure 16:
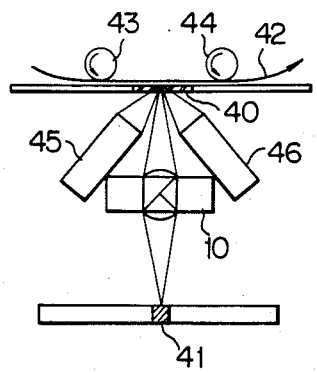
FIG. 16 is a schematic illustration of one example of a reading apparatus using the small-size image-formation optical system of the invention.

FIG. 16 shows an example of a reading apparatus in which the small-size image formation optical system 10 in accordance with the invention is employed. The image formation optical system 10 is positioned between a contact glass 40, which parallels the optical system 10, and a solid scanning element array 41, such as an amorphous semiconductor sensor array, onto the contact glass 40. An original 42, which is to be read, is transported intermittently, or continuously and slowly, by conveying rollers 43 and 44. One line section of images of the original 42 illuminated by illuminting light sources 45, 46 such as an LED array, is projected on the solid scanning element array 41, through the optical system 10. The image sensor-like solid scanning element array 41 accumulates electric charges through excitation by light stimulus and has the function of transferring the accumulated electric charges. Therefore, the image of one line of the original is isolated as an electric signal in a time sequence, and the reading of the original is performed. The electric image signal obtained by reading the original is sequentially input, for example, to the light emission element array 30 of the recording apparatus as shown in FIG. 15.

Figure 17:
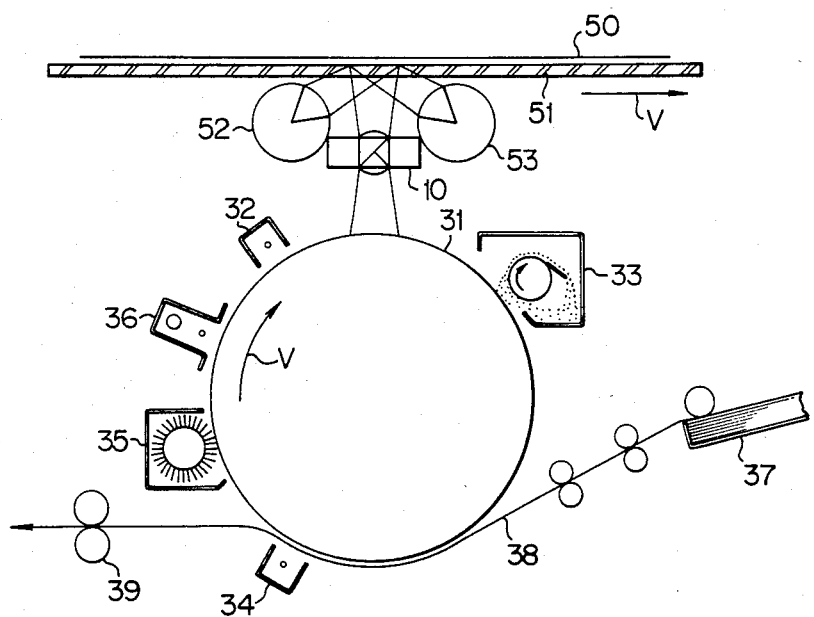
FIG. 17 is a schematic illustration of one example of a slit-exposure type copying machine using the small-size image-formation optical system of the invention.

FIG. 17 shows an example of a slit exposure type copying machine in which the small-size image formation optical system 10 of the invention is employed. This copying machine is very similar in structure to the recording apparatus shown in FIG. 15. In the copying machine, in place of the light emission element array 30 shown in FIG. 15, there is simply disposed a contact glass 51, for supporting and moving an original 50, and illumination light sources 52, 53, such as fluorescent lights for subjecting the original 50 on the contact glass 51 to slit exposure. Therefore, the members equivalent to those shown in FIG. 15 bear the same numbers. The movement speed of the contact glass 51 and the peripheral speed of the photoconductor drum 31 are the same, and the image obtained by slit illumination of the moving original 50 is projected sequentially with the same size by the optical system 10 to the surface of the photoconductor drum 31 which moves in the same direction as the moving direction of the original 50. As a result, a latent electrostatic image corresponding to the original is formed on the photoconductor 31. The formed latent electrostatic image is developed to a visible image in the same manner as in the case of the apparatus shown in FIG. 15. The developed image is then transferred to the transfer sheet 38, so that a copy of the original is obtained. The application of the present invention to this type of copying machine is possible in the case where a focusing, light transmission member is used as an image formation optical system. If other image formation optical systes are used, the present invention is also suitable for use. The embodiments described are intended to be merely exemplary and those skilled in the art will be able to make variations and modifications in them without departing from the spirit and scope of the invention. All such modification and variations are contemplated as filling within the scope of the claims.

Obviously, numerous modifications and variations of the present invention are possible in light of the above teachings. It is therefore to be understood that within the scope of the appended claims, the invention may be practiced otherwise than as specifically described herein.

What is claimed is:

1. A small-size image formation apparatus comprising two types of a plurality of prism lenses and which includes first and second prism lenses which are reversely formed, in mirror-image fashion, each prism having an upper curved surface on an upper light incident surface thereof, and a lower curved surface on a lower light emergent surface thereof, with said prism lenses being combined so as to face each other in the form of a prism lens array which are relatively shifted by a half period in phase and wherein each of said lenses further comprises a first rectangular prism, a second and third rectangular prism formed on a base portion of said first rectangular prism such that the base of one of said second and third rectangular prisms is directed downwards while base portion of the remaining prism is directed upwards with respect to said base of said first rectangular prism, a lens formed on an upper surface of said second rectangular prism and a lens formed on a lower surface portion of said third rectangular prism.

2. A small-size image formation apparatus as in claim 1, wherein each said prism lens array is formed in one piece and said prism lens arrays are combined with each other.

3. A small-size image formation apparatus as in claim 1, wherein each outer rectangular prism in said prism lens arrays further comprises a roof mirror.

4. A small-size image formation apparatus as in claim 3, wherein on both sides of a central lens portion except said roof mirror, there are formed curved surfaces having different curvatures from those of said upper curved surfaces and lower curved surfaces.

5. A small-size image formation apparatus as in claim 1, wherein said upper curved surfaces and lower curved surfaces are lenses formed separately from said prisms.

6. A small-size image formation apparatus as in claim 1, which is positioned between a stationary and parallel light emission element array and a moving photoconductive surface in a recording apparatus.

7. A small-size image formation apparatus as in claim 1, which is positioned between a moving and parallel original surface and a stationary, solid scanning element array in a reading apparatus.

8. A small-size image formation apparatus as in claim 1, which is positioned between a moving and parallel original surface and a moving photoconductive surface in a slit exposure type copying machine.

* * * * *